United States Patent
Masson et al.

(10) Patent No.: US 9,726,186 B2
(45) Date of Patent: Aug. 8, 2017

(54) METHOD FOR OPTIMIZING THE SPEED OF A TWIN-SPOOL TURBOJET ENGINE FAN, AND ARCHITECTURE FOR IMPLEMENTING SAME

(75) Inventors: Richard Masson, Les Loges en Josas (FR); Patrick Dunleavy, Palaiseau (FR); Jean-Pierre Serey, Paris (FR)

(73) Assignee: SNECMA, Paris (FR)

( * ) Notice: Subject to any disclaimer, the term of this patent is extended or adjusted under 35 U.S.C. 154(b) by 972 days.

(21) Appl. No.: 14/005,471

(22) PCT Filed: Mar. 15, 2012

(86) PCT No.: PCT/FR2012/050547
§ 371 (c)(1),
(2), (4) Date: Nov. 18, 2013

(87) PCT Pub. No.: WO2012/123684
PCT Pub. Date: Sep. 20, 2012

(65) Prior Publication Data
US 2014/0064915 A1    Mar. 6, 2014

(30) Foreign Application Priority Data
Mar. 17, 2011 (FR) ..................... 11 52209

(51) Int. Cl.
*F04D 25/00* (2006.01)
*F02C 3/113* (2006.01)
(Continued)

(52) U.S. Cl.
CPC .............. *F04D 25/00* (2013.01); *F02C 3/113* (2013.01); *F02C 7/36* (2013.01); *F02K 3/06* (2013.01);
(Continued)

(58) Field of Classification Search
CPC .... F02C 7/36; F02C 7/32; F02C 3/113; F02C 3/107; F05B 2260/40; F05B 2260/402;
(Continued)

(56) References Cited

U.S. PATENT DOCUMENTS 3,280,554 A * 10/1966 Knowles ................... F02C 7/36
                                                               475/31
4,005,575 A    2/1977 Scott et al.
(Continued)

FOREIGN PATENT DOCUMENTS

| EP | 1 270 903 | 1/2003 |
|----|-----------|--------|
| EP | 1 933 017 | 6/2008 |
| WO | 2008 105815 | 9/2008 |

OTHER PUBLICATIONS

International Search Report Issued Jun. 5, 2012 in PCT/FR12/50547 Filed Mar. 15, 2012.

*Primary Examiner* — Craig Kim
*Assistant Examiner* — Maxime Adjagbe
(74) *Attorney, Agent, or Firm* — Oblon, McClelland, Maier & Neustadt, L.L.P.

(57) ABSTRACT

A method and system improving energy efficiency of a turbojet engine by optimizing rotating speed of a fan and operability of an engine, by freeing the fan from exclusive control of a low-pressure (LP) shaft by providing combined control with a high-pressure (HP) shaft when cruising power has been reached. The turbojet engine include at least one LP turbine and one HP turbine coupled to coaxial LP shafts and HP shafts, respectively, which can drive LP and HP compressors, respectively. The LP compressors include a fan that forms a first primary air-intake compression stage. The LP and HP shafts are mounted on one of two driving mechanisms, an inner ring gear, and a planet carrier for a planetary gear train for driving the fan, the HP shaft being mounted on
(Continued)

a disengagement mechanism and the fan being coupled to the planetary gear train via an outer driven ring gear.

14 Claims, 3 Drawing Sheets

(51) Int. Cl.
*F02C 7/36* (2006.01)
*F02K 3/06* (2006.01)

(52) U.S. Cl.
CPC ............... *F05D 2260/4023* (2013.01); *F05D 2260/40311* (2013.01); *F05D 2260/902* (2013.01); *Y02T 50/671* (2013.01)

(58) Field of Classification Search
CPC ........... F05B 2260/4023; F04D 13/028; F04D 25/028; F01D 5/026; F02K 3/06
See application file for complete search history.

(56) References Cited

U.S. PATENT DOCUMENTS

| | | | |
|---|---|---|---|
| 4,916,894 A | | 4/1990 | Adamson et al. |
| 5,174,105 A | * | 12/1992 | Hines ........................ F02C 3/10 60/774 |
| 5,349,814 A | * | 9/1994 | Ciokajlo ................. F02C 7/262 60/226.1 |
| 2002/0189231 A1 | | 12/2002 | Franchet et al. |
| 2008/0138195 A1 | | 6/2008 | Kern et al. |
| 2009/0293445 A1 | | 12/2009 | Ress, Jr. |

* cited by examiner

METHOD FOR OPTIMIZING THE SPEED OF A TWIN-SPOOL TURBOJET ENGINE FAN, AND ARCHITECTURE FOR IMPLEMENTING SAME

BACKGROUND OF THE INVENTION

Field of the Invention

The invention relates to a method for optimising the speed of a twin-spool turbojet engine fan, and to a turbojet engine architecture for implementing this method.

Description of the Related Art

The field of the invention is that of the energy efficiency of two-flow, twin-spool or even three-spool turbojet engines. In a two-flow turbojet engine, the intake air flow separates beyond the fan into a secondary air flow, accelerated by the blades of the fan to form a supplementary thrust without passing through the combustion chamber, and a primary flow which can be compressed in order to be injected into the combustion chamber. In a twin-spool architecture, a low pressure (LP) turbine and a high pressure (HP) turbine are coupled respectively to coaxial LP and HP shafts suitable respectively for driving LP and HP compressors for compressing the primary flow, the fan also forming the first compression stage of the LP compressor.

To improve the propulsion energy efficiency, which translates into a reduction in the specific fuel consumption (SFC), the secondary flow must be able to generate the greatest possible thrust with, consequently, the greatest possible reduction in exhaust velocities of particles of air and waste gas. Three-flow turbojet engines have thus been developed. However, they are rarely used, as the increase in thrust obtained compared to a two-flow turbojet engine is too small given the additional volume which results from the presence of the third spool.

The efficiency can still be substantially improved, in particular when the engine is at cruising power, by the use of speed reducers, for example of the planetary gear train type.

The use of a planetary gear train is known for reducing the specific fuel consumption. This train is generally mounted between an LP turbine and an appropriate portion of LP compressors, as described in EP 1 933 017 or EP 1 931 290.

Such a planetary gear train can also serve as a speed accelerator for driving a fan and an LP supercharger in counter rotation from the LP shaft, as described in patent application WO 2008 105815. This application also provides for progressive engagement by meshing of the LP shaft.

In application WO2006059970, the planetary gear train makes it possible to optimise the distribution of power from the LP shaft between the fan and the LP compressor, depending on the flight conditions.

Furthermore, a magnetic or electromagnetic speed reducer has been used in EP 1 933 017 to transfer power and torque from the HP shaft to the LP shaft in order to drive electric generators at low speeds.

BRIEF SUMMARY OF THE INVENTION

The invention aims to solve this problem of improving the energy efficiency, that is to say of substantially reducing the specific fuel consumption, by optimising the rotational speed of the fan and the operability of the engine. To this end, it proposes no longer driving the fan only by means of the LP shaft, but also transmitting power from the HP shaft to the fan.

More specifically, the present invention relates to a method for optimising the rotational speeds of an at least two-flow and twin-spool turbojet engine, comprising at least one low pressure or LP compressor/turbine assembly and one high pressure or HP compressor/turbine assembly respectively comprising coaxial LP and HP shafts for transmitting power from a turbine to the compressor of the same assembly, and in which a fan, forming a first primary air intake compression stage, is driven by planetary gearing connected to the LP transmission shaft and, in a disengageable manner, to the HP transmission shaft in order to adjust in a differentiated manner the rotational speeds of the fan, the LP assembly and the HP assembly, making it possible to reach optimum speeds, depending on the engine speed.

In these conditions, the flexibility of power transmission delivered with only two LP and HP transmission shafts for optimising three speeds, namely speed of the fan and speed of each of the aforementioned assemblies, makes it possible to improve the operability of the engine at cruising power, in particular its acceleration capacity, without substantially increasing its specific fuel consumption.

According to particular embodiments, depending on the option selected:
  when the turbojet engine is at cruising power, the HP shaft is in driving planetary gearing and its power added to that of the LP shaft;
  in flight phases outside cruising power, disengagement of the HP shaft is actuated, depending on the flight conditions, the disengaged coupling between the fan and the HP shaft then being locked against rotation.

The invention also relates to a turbojet engine architecture for implementing the above method. Such an architecture is of at least twin-spool and two-flow type, and comprises at least one LP turbine and one HP turbine coupled respectively to coaxial LP and HP shafts capable respectively of driving LP and HP compressors, the LP compressors comprising a fan forming a first primary air intake compression stage. The LP and HP shafts are mounted on one or the other of driving means constituted by an inner ring gear and a planet carrier of a planetary gear train for driving the fan, the HP shaft being mounted on disengagement means and the fan being coupled to the planetary gear train by a driven outer ring gear.

According to preferred embodiments:
  the HP shaft has disengagement means mounted between an HP engine shaft portion connected to the HP turbine and an HP drive shaft portion capable of driving the fan via a driving means of the planetary gear train;
  the diameters of the one or two driving means, depending on whether one or two driving means are movable, in relation to the diameter of the driven outer ring gear, are determined such that the outer ring gear can be driven by the planetary gear train at pre-established speeds depending on speed reduction ratios R between the speed of the driven outer ring gear connected to the fan, and that resulting from the driving means connected to the LP shaft and the HP shaft when it is not disengaged;
  the HP drive shaft portion is mounted on the inner ring gear and the LP shaft on the planet carrier, the inner ring gear and the planet carrier being the driving means;
  the LP drive shaft portion is mounted on the inner ring gear and the HP shaft on the planet carrier, the planetary gear train being mounted, on the axis of symmetry, in an opposite manner to that corresponding to the mounting above;

the driving means connected to the HP drive shaft are fitted with locking means for stopping these driving means when the drive portion of the HP shaft is disengaged.

BRIEF DESCRIPTION OF THE SEVERAL VIEWS OF THE DRAWINGS

Other features and advantages of the invention will become clear upon reading the detailed description below, relating to embodiments of the invention with reference to the appended figures, in which.

DETAILED DESCRIPTION OF THE INVENTION

Figure 1:
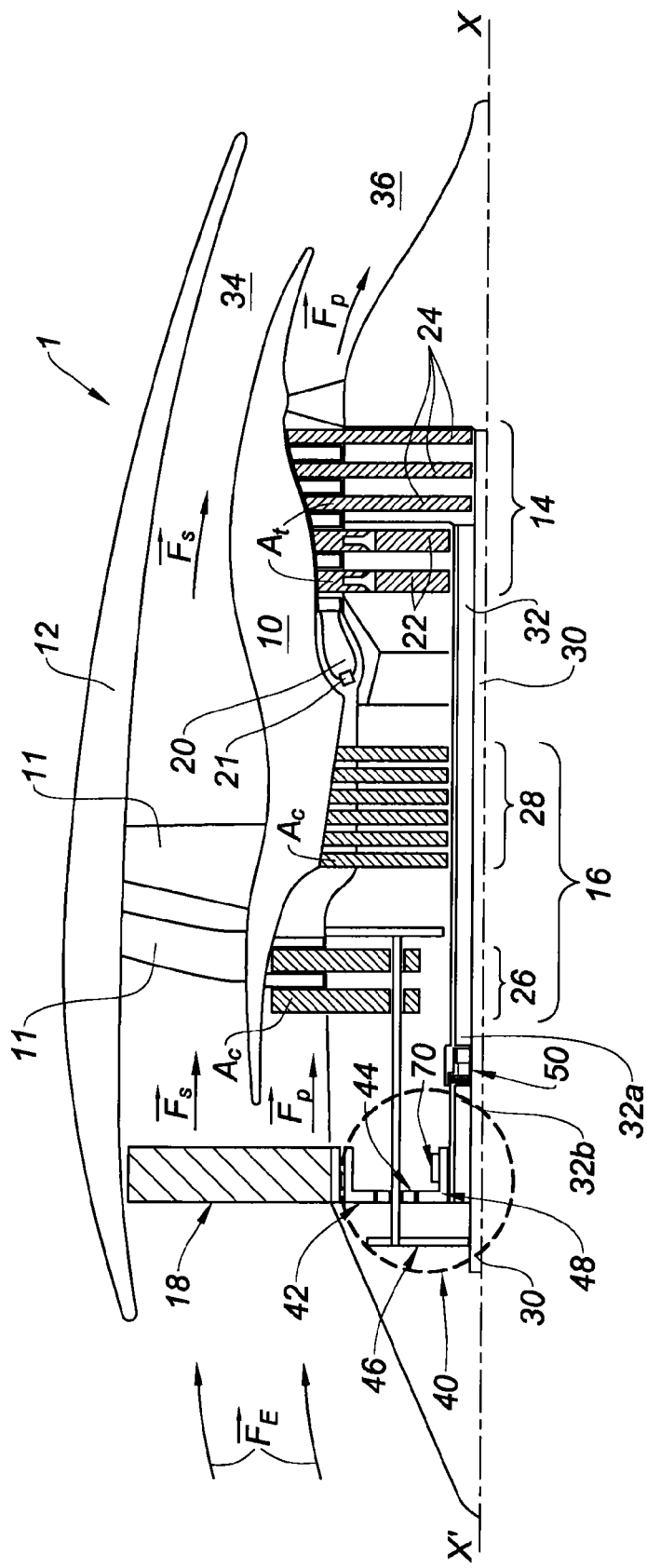
FIG. 1 is a schematic half view in longitudinal section of an example of turbojet engine architecture according to the invention with the HP shaft engaged on the planetary gear train at cruising power.

With reference to the longitudinal half view along the axis of symmetry X'X in FIG. 1, a turbojet engine architecture 1 according to the invention conventionally and schematically comprises a casing 10 fixed by arms 11 in a protective nacelle 12, the casing housing a twin-spool turbine 14 driving a twin-spool compressor 16. A fan 18 is arranged in the region of the intake air flow $\vec{F}_E$ of the nacelle 12, the air being separated into two flows in the turbojet engine, a primary air flow $\vec{F}_p$ in the casing 10 and a secondary air flow $\vec{F}_s$ between the nacelle 12 and the casing 10. The combustion chamber 20, into which the secondary air flow $\vec{F}_s$ penetrates via an injector 21, is arranged between the turbine 14 and the compressor 16.

The combustion of the air/fuel mixture (for the sake of clarity, the fuel supply is not shown in the figure) in the chamber 20 drives in rotation, via their peripheral blades $A_p$, the HP 22 and LP 24 turbines of the twin-spool turbine 14. In turn, the LP and HP turbines respectively drive in rotation the LP 26 and HP 28 compressors of the twin-spool compressor 16 by respectively coupling with the coaxial LP 30 and HP 32 shafts of axis X'X, the LP shaft being concentric with the HP shaft. The fan 18 is also driven by the last stages of the LP turbines via the LP shaft. LP or HP assemblies are thus formed by association of an LP 24 or HP 22 turbine with the corresponding LP 26 or HP 28 compressor, connected to the corresponding LP 30 or HP 32 transmission shaft.

The primary air flow $\vec{F}_p$ is then compressed in the blade assemblies Ac of the compressor 16 before entering the combustion chamber 20, then expanded in part in the turbine 14 and in full in the secondary exhaust pipe 34. The secondary air flow $\vec{F}_s$, accelerated by the fan 18, also participates in the thrust by ejection through a primary nozzle 36. The flows can be accelerated and ejected through a common nozzle (not shown).

According to the invention, a planetary gear train 40 is provided to allow the fan to be driven cumulatively by the LP and HP shafts, for example at cruising power. As shown more particularly in FIG. 2, this train comprises an outer ring gear 42 as output gear, planet gears 44 (five planet gears in the example) for power transmission between the sun gears, a planet carrier 46 fitted on a central mandrel, and an inner ring gear 48 as input sun gear. The input ring gear and the planet carrier form the driving means, the outer ring gear 42 forming the driven means. The ring gears and the planet gears are conventionally meshed with one another via cylindrical gear pairs.

The LP 30 and HP 32 shafts are mounted on the driving means of this train 40. In this example the end of the LP shaft 30 forms the central mandrel of the planet carrier 46 and the HP shaft 32 is integral with the inner ring gear 48. Furthermore, the fan 18 is coupled to the outer ring gear 42 in order to be driven in rotation at the output of the planetary gear train.

At cruising power the LP and HP shafts rotate in the nominal flight conditions. The LP shaft, by means of the planet carrier 46, drives the fan 18 via the outer ring gear at the rotational speed of the LP shaft increased independently by the rotational speed of the inner ring gear 48 driven by the HP shaft. Thus, the speed of the fan results from independent adjustment of the speeds of the LP and HP shafts, such that the speeds of the fan and of each of the shafts can be adjusted in a differentiated manner, which makes it possible to optimise each of these speeds.

Figure 2:
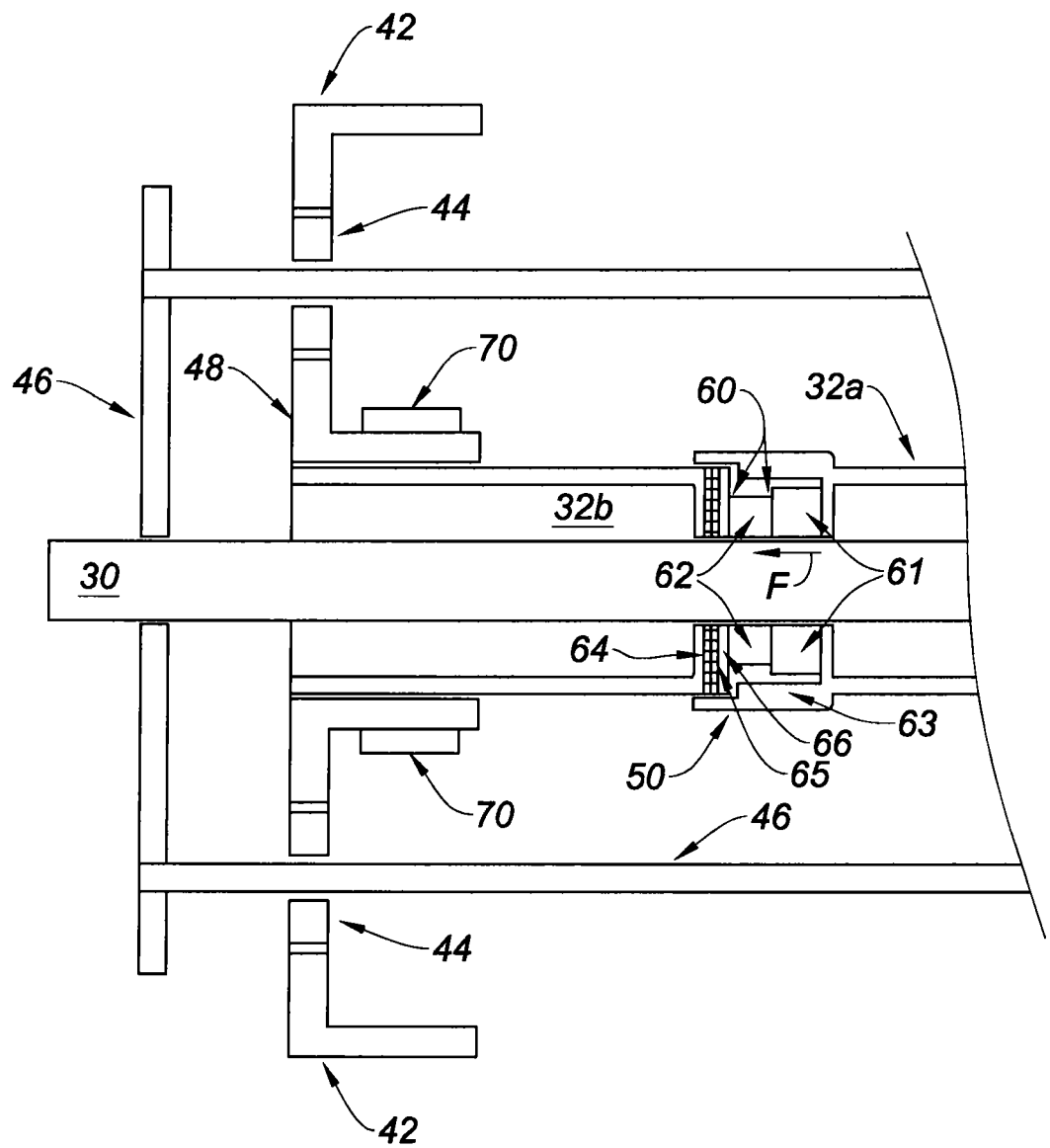
FIG. 2 is an enlarged view of the assembly of the planetary gear train and the means for disengaging the HP shaft of FIG. 1, in two sectional planes of the planet gears.

If the HP shaft were not rotating, only the speed of the planet carrier, that is to say that of the LP shaft, would be active. This possibility can be implemented by disengaging the HP shaft, for example at engine speeds other than cruising power and when the pilot deems it necessary on the basis of the flight conditions. As shown in FIG. 2, the disengagement means 50 separate the HP shaft into two portions: an HP engine shaft portion 32a connected to the HP turbine and an HP drive shaft portion 32b for driving the inner ring gear 48.

The disengagement is achieved by any known means, for example by a friction clutch 60 having an electric drive 61, integral with the engine portion 32a. The drive drives a piston 62, mounted in a fixed chassis 63, in displacement in the direction of the arrow F. The piston 62 is for example driven by an electric motor 61 operated in connection with the control unit of the airplane (not shown).

The piston 62 drives the temporary connection means 65 mounted on a support 66. These connection means can be a friction disk or claw clutch means or the like. The connection means 65 cooperate with means 64 for receiving the drive shaft portion 32b, then in an engaged position. The inner ring gear 48 which is integral with the shaft portion 32b is then also driven.

When the electric drive drives the piston in the opposite direction to the arrow F, the friction means 65 and thus the engine shaft portion 32a no longer drive the shaft portion 32b. The inner ring gear 48 is no longer driven.

Alternatively, other types of clutch can be implemented, for example hydraulic or electromagnetic servomotor clutches.

Locking means are advantageously provided to stop the rotation of the inner ring gear 48 and the drive portion 32b of the HP shaft when said shaft is disengaged. In the example, these means are brake jaws 70 surrounding the ring gear 48 or, in a variant, the HP shaft portion 32b. The locking means are preferably controlled by the actuation of the disengagement means 50 towards the disengagement position.

At cruising power, the outer ring gear 42 is driven by the planetary gear train 40 at speeds determined by adjusting the speed reduction ratio R between the speed of the driven means, in this case that $\omega_p$ of the driving means, i.e. at least the planet carrier 46 on which the LP shaft is mounted.

This speed reduction ratio depends on the relationship "k" between the diameter of the driving means—diameter $D_p$ of the planet carrier 46—on one hand and the diameter $D_e$ of the driven outer ring gear 42 on the other hand. The calculations result from adaptation of Willis's general formula, which expresses a reduction ratio in the form of a relative speeds ratio at a reference frame linked to the planet carrier, between the relative speeds of the outer ring gear and the inner ring gear.

In cases where the HP shaft is disengaged, that is to say in cases where it is appropriate to recuperate all the power, for example when starting the engine, upon cut-off or any engine incident, that is to say outside cruising power or for any reason deemed valid by the pilot, the speed of the inner ring gear $\omega_i$ is cancelled by the locking means.

Thus, knowing the value of the optimum speeds to be reached, it is possible to deduce the value of the diameters of the components of the planetary gear train from the Willis equation.

Figure 3:
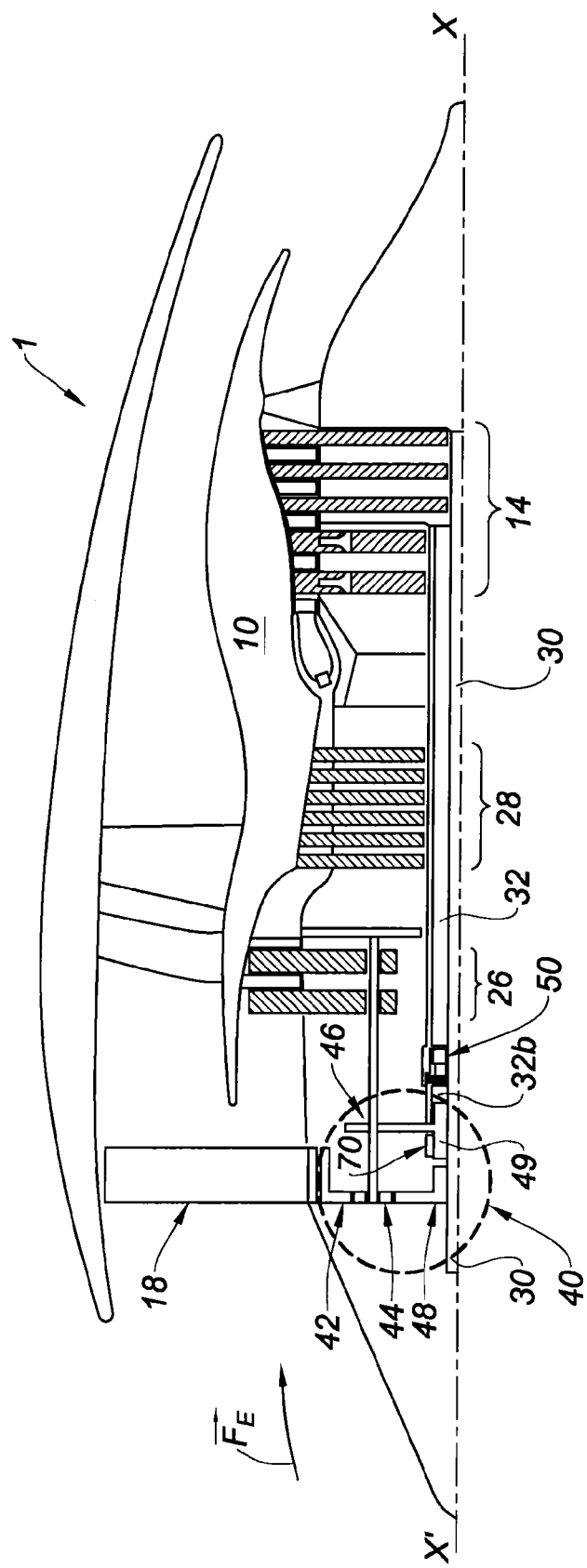
FIG. 3 is a schematic half view in longitudinal section of a variant of the turbojet engine architecture of FIG. 1.

A variant of the turbojet engine architecture example above is shown in FIG. 3. Identical references to those in FIG. 1 denote like elements. In this variant, the drive portion 32b of the HP shaft 32 is integral with the central mandrel 49 of the planet carrier 46 and the LP shaft 30 is integral with the inner ring gear 48. The fan 18 remains mounted on the outer ring gear 42. In this version, since the shaft portion 32b is integral with the planet carrier 46, the locking jaws 70 grip the central mandrel 49 of the planet carrier 46.

The fundamental difference between the two types of mounting lies in the orientation of the planetary gear train. The planet carrier 46 is now arranged downstream on the axis X'X, in the flow direction of the intake air flow $\vec{F}_E$ in relation to the ring gears 42 and 48 of the planetary gear train 40, while in FIGS. 1 and 2 the planet carrier 46 is mounted upstream of these same ring gears.

Within the scope of this variant, the speed reduction ratio is linked by the following equation from Willis's formula:

$$R' = \frac{\omega_e}{\omega_i} = (1+k)\frac{\omega_p}{\omega_i} - k \qquad (2)$$

Based on knowledge of the speeds, in particular the cruising speed, the value of k and thus that of the diameters of the components of the planetary gear train are deduced from equation (2), in a similar way as the first embodiment.

The invention is not limited to the embodiments described and shown. For example, it is possible to provide a planetary gear train having a double set of planet gears mounted on the same axes and of different diameters, meshing respectively on the inner ring gear and on the outer ring gear, a multistage train or a plurality of cascaded trains. The planetary gearings of the planetary gear trains can be cylindrical or conical. In addition, the invention can be applied to fans having at least two stages. Furthermore, the LP compressor can be integral with the fan, it then being possible to regard the fan as forming the first stage of this compressor.

The invention claimed is:

1. A method for optimizing rotational speeds of an at least two-flow and twin-spool turbofan engine, comprising at least one low pressure (LP) compressor/turbine assembly and one high pressure (HP) compressor/turbine assembly respectively comprising coaxial LP and HP transmission shafts for transmitting power from a turbine to the compressor of the assembly, and in which a fan forms a first primary air intake compression stage, the method comprising:
    providing a planetary gear train for driving the fan, the planetary gear train including driving means and driven means, and the HP transmission shaft being engageable and disengagable with the driving means of the planetary gear train;
    at a first operating condition, engaging the HP transmission shaft such that the fan is driven by the LP transmission shaft and the HP transmission shaft; and
    at a second operating condition, disengaging the HP transmission shaft such that the fan is driven only by the LP transmission shaft.

2. An optimization method according to claim 1, wherein the first operating condition is when the turbofan engine is at cruising power.

3. An optimization method according to claim 1, wherein the second operating condition is a flight phase outside cruising power.

4. An optimization method according to claim 1, wherein the HP transmission shaft is engageable and disengagable with the driving means of the planetary gear train via a friction clutch.

5. An optimization method according to claim 1, wherein the LP transmission shaft and the HP transmission shaft are connected to the driving means of the planetary gear train and the fan is connected to the driven means of the planetary gear train.

6. A turbofan engine architecture comprising:
    at least one low pressure (LP) turbine and one high pressure (HP) turbine coupled respectively to coaxial LP and HP transmission shafts capable respectively of driving LP and HP compressors, the LP compressors comprising a fan forming a first primary air intake compression stage;
    a planetary gear train for driving the fan, the planetary gear train including driving means and driven means; and
    disengagement means which engage and disengage the HP transmission shaft with the driving means of the planetary gear train,
    wherein, in a first operating condition, the HP transmission shaft is engaged such that the fan is driven by the LP transmission shaft and the HP transmission shaft, and
    wherein, in a second operating condition, the HP transmission shaft is disengaged such that the fan is driven only by the LP transmission shaft.

7. A turbofan engine architecture according to claim 6, wherein the driving means includes an inner ring gear of the planetary gear train and a planet carrier of the planetary gear train, and the fan is connected to a driven outer ring gear of the planetary gear train.

8. A turbofan engine architecture according to claim 7, wherein the disengagement means is mounted between an HP engine shaft portion connected to the HP turbine and an HP drive shaft portion capable of driving the fan via the driving means of the planetary gear train.

9. A turbofan engine architecture according to claim 7, wherein diameters of the driving means in relation to a diameter of the driven outer ring gear, are determined such that the outer ring gear can be driven by the planetary gear train at pre-established speeds depending on speed reduction ratios between a speed of the driven outer ring gear connected to the fan, and that resulting from the driving means connected to the LP transmission shaft or connected to the LP transmission shaft and the HP transmission shaft.

10. A turbofan engine architecture according to claim 8, wherein the HP transmission shaft portion is mounted on the inner ring gear and the LP transmission shaft is mounted on the planet carrier.

11. A turbofan engine architecture according to claim 10, wherein an LP drive shaft portion is mounted on the inner ring gear and the HP transmission shaft is mounted on the planet carrier, the planetary gear train being mounted, on an axis of symmetry, in an opposite manner to that corresponding to a mounting of the HP transmission shaft portion.

12. A turbofan engine architecture according to claim 8, wherein the driving means connected to the HP transmission shaft includes locking means for stopping the driving means when the HP transmission shaft is disengaged.

13. A turbofan engine architecture according to claim 6, wherein the LP transmission shaft and the HP transmission shaft are connected to the driving means of the planetary gear train and the fan is connected to the driven means of the planetary gear train.

14. A turbofan engine architecture according to claim 6, wherein the disengagement means include a friction clutch.

\* \* \* \* \*